United States Patent
Mills

(10) Patent No.: US 8,567,426 B2
(45) Date of Patent: Oct. 29, 2013

(54) VALVE HOUSING FOR A FUEL TANK-MOUNTED VALVE ASSEMBLY AND METHOD OF MANUFACTURING SAME

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 588 days.

(21) Appl. No.: 12/784,698

(22) Filed: May 21, 2010

(65) Prior Publication Data

US 2011/0284099 A1    Nov. 24, 2011

(51) Int. Cl.
*F16K 43/00* (2006.01)

(52) U.S. Cl.
USPC ...................................................... 137/15.17

(58) Field of Classification Search
USPC ........ 137/15.08, 15.17, 15.18, 197, 553, 554, 137/551, 587; 251/318; 29/407.9, 407.1
See application file for complete search history.

(56) References Cited

U.S. PATENT DOCUMENTS

| | | | |
|---|---|---|---|
| 3,874,636 A * | 4/1975 | Bake et al. | 251/335.2 |
| 5,277,217 A | 1/1994 | Kobayashi et al. | |
| 6,742,536 B2 | 6/2004 | Mills | |
| 7,748,397 B2 * | 7/2010 | Firtion et al. | 137/15.17 |
| 7,913,712 B2 * | 3/2011 | Vulkan et al. | 137/315.11 |
| 8,001,671 B2 * | 8/2011 | Mitchell | 29/525.01 |
| 2005/0056655 A1 * | 3/2005 | Gary | 220/737 |
| 2009/0266830 A1 | 10/2009 | Benjey | |

FOREIGN PATENT DOCUMENTS

GB    2408972 A    6/2005

* cited by examiner

*Primary Examiner* — John K. Fristoe, Jr.
*Assistant Examiner* — R. K. Arundale
(74) *Attorney, Agent, or Firm* — Quinn Law Group, PLLC

(57) ABSTRACT

A method of manufacturing a valve assembly for a fuel tank includes forming a valve housing with a recess that is sized to retain a component inserted into the recess. The component is detectable by a sensor located outside of the fuel tank when the valve assembly is mounted in the fuel tank. A valve assembly includes a valve housing having a recess. The component is retained in the recess by the valve housing.

20 Claims, 3 Drawing Sheets

__VALVE HOUSING FOR A FUEL TANK-MOUNTED VALVE ASSEMBLY AND METHOD OF MANUFACTURING SAME__

TECHNICAL FIELD

The invention relates to a valve housing for a fuel tank-mounted valve assembly, and a method of manufacturing the same.

BACKGROUND

A valve assembly is often used in a fuel tank to control vapor pressure within the fuel tank. The valve assembly is usually mounted to the fuel tank. Sometimes the fuel tank is formed in two portions, and the valve assembly is mounted to one of the portions so that it can be visibly inspected to ensure that it is properly mounted before the two portions are heat welded or otherwise joined to one another to enclose the valve assembly within the tank. In other configurations, the valve assembly mounts to the tank at an opening. When the valve assembly is visibly mounted at the opening, its proper orientation may be assured by visual inspection.

SUMMARY

While valve assemblies mounted to fuel tanks as described above are suitable for their purposes, they require additional assembly steps, such as connecting the two portions of the tank after installation of the valve, or connecting a cover over the valve assembly after it is mounted to the tank. Some fuel tanks are formed as a completed unit prior to installation of the valve assembly so that the valve assembly must be installed to an inner surface of the tank "blindly", i.e., without being able to see the inner surface, such as by reaching through an opening in the tank. A valve assembly and a method of manufacturing such a valve assembly ensure that the valve assembly will be properly positioned within the fuel tank, especially when installed blindly. The valve assembly includes a valve housing with a recess that permits a component to be inserted into the recess and retained in the recess by the housing. The component is detectable by a location sensor located outside of the fuel tank when the valve assembly is mounted in the fuel tank. Thus, although the installation of the valve assembly may be done blindly, the orientation of the installed valve assembly can be confirmed with a sensor located outside of the fuel tank. In one embodiment, the component is substantially flat and has a side. The recess is a slot with an entrance sufficiently deep to receive the side of the component.

The above features and advantages and other features and advantages of the present invention are readily apparent from the following detailed description of the best modes for carrying out the invention when taken in connection with the accompanying drawings.

DETAILED DESCRIPTION

Figure 1:
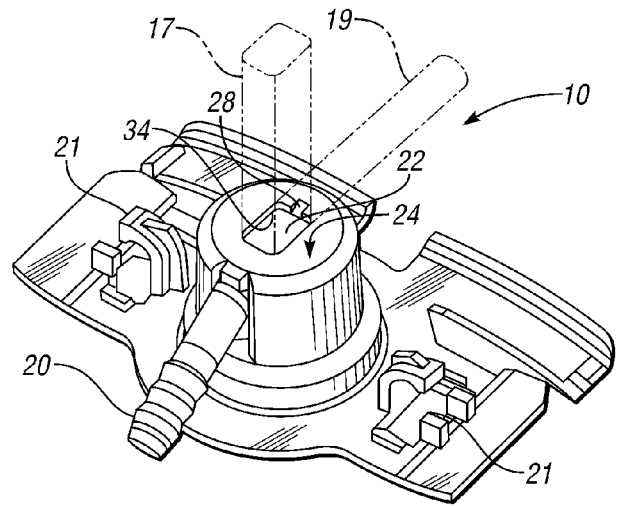
FIG. 1 is a schematic perspective illustration of a first embodiment of the valve housing with a component retained in a recess of the housing.
Figure 5:
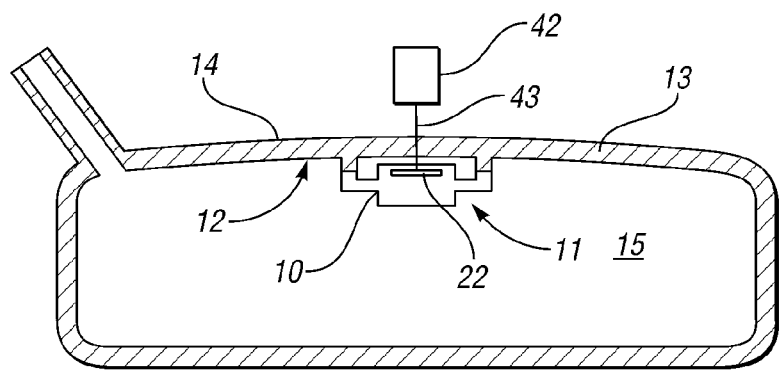
FIG. 5 is a schematic, partially cross-sectional illustration of a fuel tank having a valve assembly with the valve housing of FIG. 1 mounted to an inner surface of the fuel tank.

Referring to the drawings, wherein like reference numbers refer to like components, FIG. 1 shows a valve housing 10 that is part of a valve assembly 11 shown schematically in FIG. 5. The valve housing 10 is mounted to an inner surface 12 of a wall 13 of fuel tank 14 of FIG. 5. Additional components of the valve assembly 11 are mounted to the housing 10. The valve assembly 11 is mounted in an interior space 15 of the fuel tank 14, and may be used to control vapor pressure within the fuel tank 14. For example, at a predetermined pressure, vapor may be routed out of the fuel tank 14 through a vapor line connected to a barbed port 20 shown in FIG. 1. The valve housing 10 may be mounted to the inner surface 12 of the fuel tank 14 through an opening in the tank 14 that is not shown in the cross-sectional view in FIG. 5, and that is spaced from the location of the mounting. Mounting features 21 of the housing 10 of FIG. 1 mate with features of the inner surface 12 of the wall 13 to secure the housing 10 to the tank 14 of FIG. 5. Thus, the mounting operation is done "blindly" in that neither the valve assembly 11 nor the inner surface 12 of the fuel tank 14 is visible to an operator reaching into the tank 14.

Figure 2:
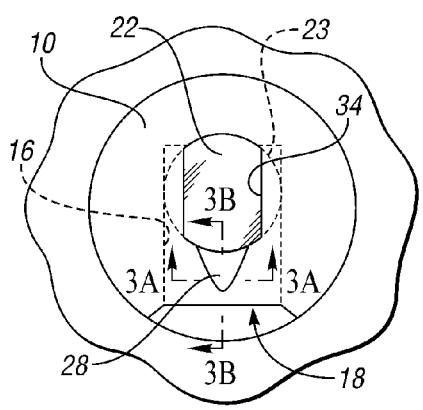
FIG. 2 is a fragmentary schematic plan view of the valve housing of FIG. 1.

To ensure proper mounting of the housing 10, the housing 10 is formed with a recess 16, best illustrated in FIGS. 2 and 4, that is sized to retain a component 22 that will be detectable by a sensor located outside of the fuel tank 14, as explained further below. Various embodiments of valve housings formed with recesses that retain the component 22, or another detectable component, are shown and described below. The housings may be formed using relatively simple and cost effective methods.

Figure 3A:
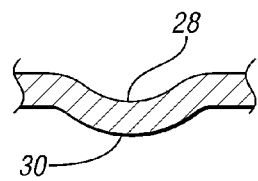
FIG. 3A is a fragmentary schematic illustration in cross-sectional view of a portion of the valve housing of FIGS. 1-2 taken at the lines 3A-3A in FIG. 2.
Figure 3B:
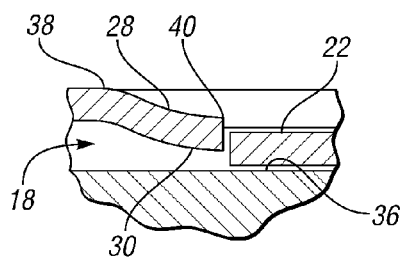
FIG. 3B is a fragmentary schematic illustration in cross-sectional view of a portion of the valve housing of FIGS. 1-2 taken at lines 3B-3B in FIG. 2A, showing the component retained in a recess formed by the housing.
Figure 4:
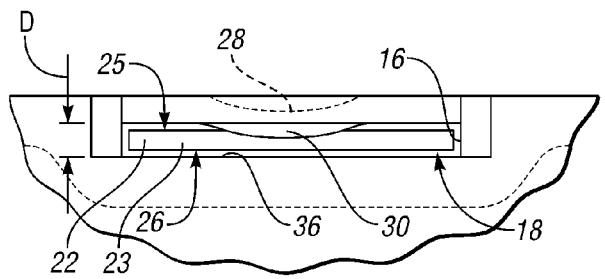
FIG. 4 is a schematic fragmentary side view of the valve housing of FIGS. 1-3B.

Referring to FIGS. 1-4, the valve housing 10 is formed as a one-piece, injection-molded housing, although the housing 10 may alternately be formed by other methods and in multiple pieces. The housing 10 is formed with the recess 16 that is a slot, and also referred to as a pocket. The detectable component 22 is a substantially flat metal disc with a side 23 that defines the periphery of the component 22 and is between two opposing faces 25, 26, as shown in FIG. 4. The recess 16 is formed with an entrance 18 that has a depth D sufficient to allow the side 23 of the component 22 to be inserted first. The component 22 is pushed into the recess 16 with the side 23 (see FIG. 2) leading into the recess 16. A detectable component with a different shape than a disc, such as a rectangular shape, may be used instead. A disc-shaped component may decrease the number of assembly steps since a disc has only one continuous side, so a specific side of the component need not be oriented to the entrance before insertion into the recess.

The recess 16 is formed during injection molding by positioning two inserts 17 and 19 (shown in FIG. 1) in a die. Insert 17, shown in phantom in FIG. 1, extends downward to form an opening 34 extending from an upper surface 24 of the housing 10 to an inner surface 36, shown in FIG. 4, on which the component 22 will rest. Another insert 19, also shown in phantom in FIG. 1, is positioned orthogonal to the opening 34 and orthogonal to insert 17 to form the recess 16. The inserts 17, 19 are shown schematically only. The shapes of the inserts 17, 19 may be more complex than is shown.

During forming of the housing 10, the upper surface 24 of the housing 10 is formed with a slight depression 28 to create a lip 30, shown in FIGS. 3A-4. The lip 30 is spaced slightly back from the entrance 18 toward the center of the housing 10, as shown in FIG. 3B, and angles downward from an outer portion 38 to an inner portion 40. The lip 30 ends at the opening 34 extending from the upper surface 24 (see FIG. 1) of the housing 10 to the inner surface 36 (see FIG. 4) on which the component 22 rests. The slight inward angling of the lip 30 allows the component 22 to slide into the recess 16 by slightly flexing the lip 30 upward. The inner portion 40 of the lip 30 will then block the component 22 from backing out of the entrance 18 when the lip 30 flexes back to its original, unstressed position, as shown in FIG. 3B.

FIG. 5 shows the valve housing 10 secured to the tank 14. A sensor 42 positioned outside of the tank 14 can be used to determine the depth and angular orientation of the component 22 within the tank 14, as indicated by signal 43 emanating from sensor 42 to determine the position of component 22. The component 22 may be a stamped metal disc. The recess 16 is designed so that the inserted component 22 is exposed at the opening 34 which will be adjacent the surface 12 when the valve assembly 11 is mounted to the tank 14 of FIG. 5. The sensor 42 may be a metal detector. This positioning data can be compared to a stored position value to verify that the housing 10 is correctly mounted.

Figure 6:
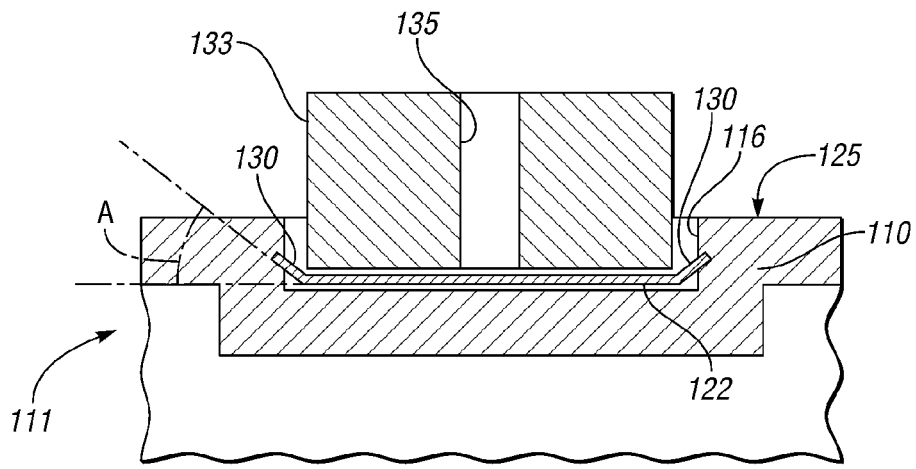
FIG. 6 is a schematic fragmentary cross-sectional illustration of a second embodiment of a valve housing showing a second embodiment of a component pressed into a recess formed in the valve housing.
Figure 7:
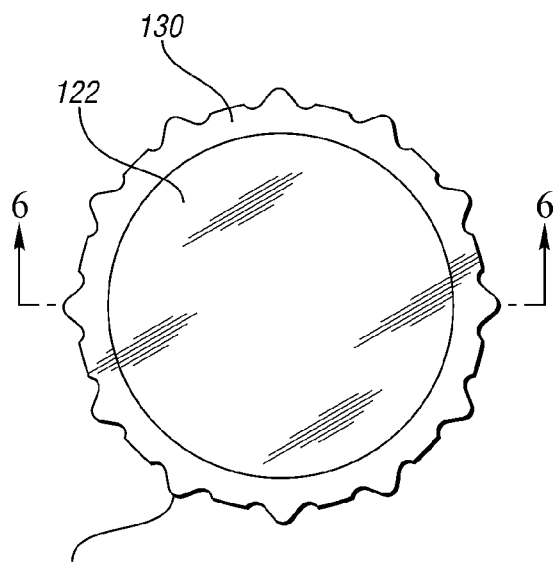
FIG. 7 is a schematic plan view illustration of the disc of FIG. 6.

FIGS. 6 and 7 show an alternative embodiment of a valve housing 110 for a valve assembly 111 that can be mounted internally to tank 14 such as housing 10 is mounted in FIG. 5. The valve housing 110 is formed with a recess 116 formed in an upper surface 125 of the housing 110. The housing 110 may be a one-piece, injection-molded component. The recess 116 is cylindrical in shape, but is not limited to a cylindrical shape. A detectable component 122 is inserted into the recess 116. The component 122 is a generally annular, stamped metal disc with an angled rim 130. The angle A of the rim 130 may be thirty degrees, but other angles will also be sufficient. The rim 130 has a toothed or variegated edge 134. As shown in FIG. 6, an arbor press 133 has a passage 135 to which a vacuum source (not shown) is attached to hold the component 122 to the press 133. The press 133 lowers the component 122 and presses the component 122 into the recess 116. The variegated edge 134 interferes with the housing 110 at the recess 116, digging into the housing 110. The vacuum source is shut off, and the arbor press 133 is withdrawn, with the detectable component 122 now retained to the housing 110 in the recess 116. The position of the detectable component 122 is detectable by the sensor 42 when the housing 110 is mounted to the inner surface 12 of the tank 14 of FIG. 5. The recess 116 is designed so component 122 is exposed and will be positioned adjacent surface 12 of FIG. 5 when the valve assembly 111 is mounted to tank 14. The position of the detectable component 122 is indicative of the mounted position of the housing 110, and can thus be used to verify appropriate installation of the housing 110 within the tank 14.

Figure 8:
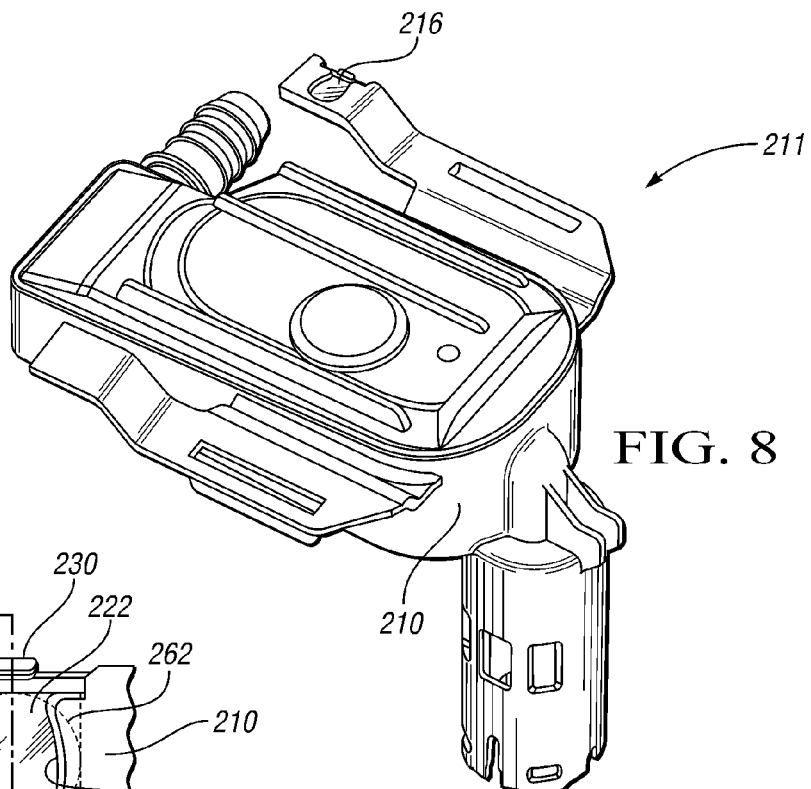
FIG. 8 is a schematic perspective illustration of a third embodiment of a valve housing for a valve assembly for the fuel tank of FIG. 5, having another component retained in a recess formed by the housing.
Figure 9:
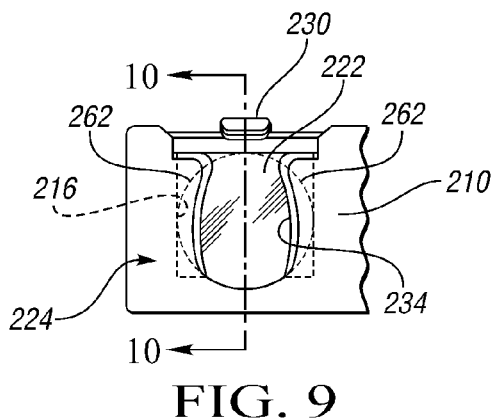
FIG. 9 is a schematic plan view, fragmentary illustration of the recess in the housing of FIG. 7.
Figure 10:
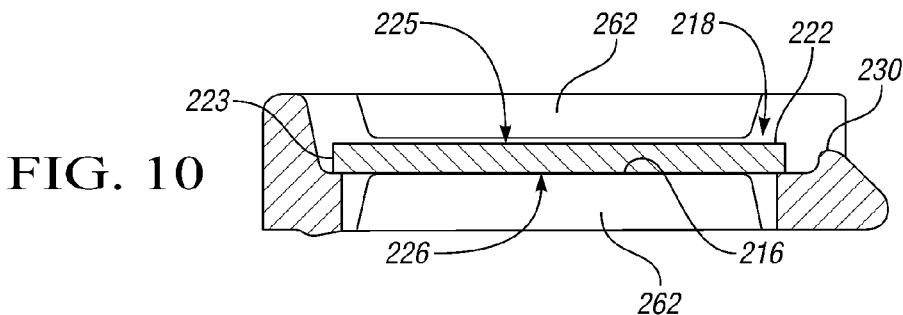
FIG. 10 is a cross-sectional illustration of the portion of the housing shown in FIG. 9 taken at lines 10-10.

FIGS. 8-10 illustrate a third embodiment of a housing 210 for a valve assembly 211. The housing 210 mounts to the surface 12 of the tank 14 of FIG. 5 by any means, such as by welding, etc. An opening 234 extends from the outer surface 224 of the housing 210 all the way through the housing 210. The opening 234 and a recess 216 are formed with an injection molding tool from above and below. The recess 216 retains a detectable component 222. Referring to FIG. 10, the component 222 has a side 223 and opposing surfaces 225, 226. Referring to FIG. 8, the housing 210 may be injection-molded. Referring to FIG. 9, the housing 210 has side ledges 262 that overhang the recess 216 both above and below the component 222 to retain the edges of the component 222. The recess 216 extends beyond the ledges 262 so that the ledges 262 act as sleeves to partially cover portions of the component 222. The housing 210 forms a lip 230 that extends upward at an edge of the recess 216, as shown in FIG. 10. The lip 230 and ledges 262 are flexible enough to allow the component 222 to be slid with side 223 entering first into an entrance 218 of the recess 216. Once inserted, the lip 230 interferes with the component 222 when the component 222 moves toward the lip 230, retaining the component 222 within the recess 216. The component 222 is exposed at the opening 234 adjacent the inner surface 12 of the fuel tank 14 of FIG. 5 when the assembly 211 is installed in the tank 14.

Figure 11:
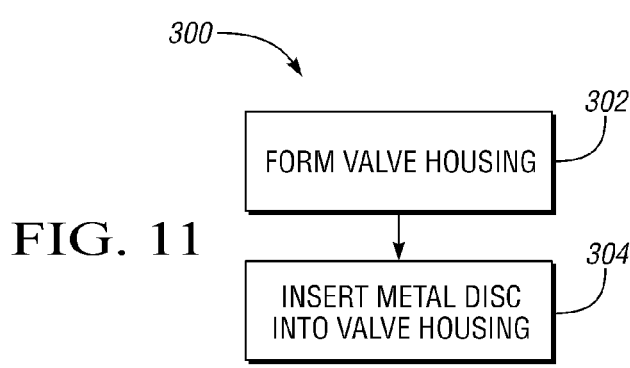
FIG. 11 is a flow diagram illustrating a method of manufacturing the valve housings of FIGS. 1-10.

FIG. 11 shows a flowchart of a method 300 of manufacturing a valve assembly for mounting internally to a fuel tank 14, such as valve assemblies 11, 111 and 211 of FIGS. 1-10. The method 300 begins with step 302, forming a valve housing 10, 110 or 210 with a recess 16, 116 or 216 sized to retain a component 22, 122, 222 inserted into the recess 16, 116, 216. Step 302 may be carried out by an injection-molding process, but other manufacturing methods, such as machining, may also be used. Forming the housing 10, 110 or 210 with a recess 16, 116 or 216 may include forming an opening 34, 234 and/or a lip 30, 230, and may require holding inserts 17, 19 to form the opening 34 and recess 16.

After the housing 10, 110 or 210 is fully formed, the detectable component 22, 122 or 222 is inserted into the recess 16, 116 or 216 in step 304. For some types of formed housings 10 or 210, such as recess 16 or 216, the component 22 or 222 is inserted side-first, because the recess 16 or 216 is formed like a pocket or slot. For other configurations of formed housings, such as housing 110, the component 122 is inserted by pressing the component 122 into the recess 116 face-first, using an arbor press or the like.

Once the component 22, 122 or 222 is inserted into the housing 10, 110 or 210, the housing 10, 110 or 210 may be mounted to the inner surface 12 of the fuel tank 14, and the component 22, 122 or 222 will be detectable by sensor 42. Forming the housing 10, 110 or 210 with a recess 16, 116 or 216, and in some embodiments with a lip 30, 230, enables a relatively quick and easy insertion process for the disc 22, 122 or 222.

While the best modes for carrying out the invention have been described in detail, those familiar with the art to which this invention relates will recognize various alternative designs and embodiments for practicing the invention within the scope of the appended claims.

The invention claimed is:
1. A valve assembly comprising:
a valve housing having a recess with an entrance;

a component fit through the entrance and retained in the recess by the valve housing; wherein the valve housing includes an opening that is substantially orthogonal to the entrance and that extends from an outer surface of the valve housing to the recess so that the component is exposed at the opening;

wherein the component has substantially flat opposing faces and has a generally cylindrical side between the faces; wherein the recess is a slot and the entrance is sufficiently deep to permit the component to be inserted into the slot through the entrance only with the side facing the entrance and with one of the substantially flat opposing faces facing the opening; and wherein the component is a material that can be sensed by a sensor.

2. The valve assembly of claim 1, wherein the valve housing forms a lip that extends into and is exposed in the recess, the lip being sufficiently configured to allow insertion of the component past the lip into the recess and to prevent the component from passing out of the recess when the component contacts the lip, the component thereby being retained in the recess by the lip.

3. The valve assembly of claim 2, wherein the lip is flexible to allow the component to move past the lip when the component is inserted into the recess.

4. The valve assembly of claim 1, wherein the valve housing is a one-piece, injection-molded valve housing wherein the component is a metal disc; and wherein the valve housing forms a lip that extends into and is exposed in the recess and retains the metal disc in the recess when the metal disc contacts the lip; and wherein the lip is a depression in a surface of the valve housing.

5. The valve assembly of claim 4, wherein the recess has an entrance; wherein the metal disc is substantially flat and has a generally cylindrical side; wherein the entrance is sufficiently deep to receive the generally cylindrical side of the metal disc through the entrance.

6. The valve assembly of claim 4, wherein the valve housing is configured to surround a portion of the recess and retain and partially cover the metal disc when the metal disc is in the recess.

7. The valve assembly of claim 4, wherein the recess is cylindrical.

8. The valve assembly of claim 1, wherein the valve housing forms a lip that extends into and is exposed in the recess and retains the component in the recess when the component contacts the lip; and
wherein the lip is a depression in a surface of the valve housing.

9. The valve assembly of claim 8, wherein the lip angles from the surface toward the recess; and
wherein the lip has an inner portion configured to interfere with the component to prevent movement of the component out of the recess.

10. The valve assembly of claim 8, wherein the lip is flexible to allow the component to move past the lip when the component is inserted into the recess.

11. The valve assembly of claim 1, wherein the recess extends through the valve housing; wherein the valve housing is configured with ledges surrounding a portion of the recess and that retain and partially cover the component when the component is in the recess.

12. The valve assembly of claim 11, wherein the valve housing forms a lip at an edge of the recess; and
wherein the lip is configured to interfere with the component to prevent movement of the component out of the recess when the component contacts the lip.

13. The valve assembly of claim 11, wherein the ledges are configured to contact both of the substantially flat opposing faces.

14. An assembly comprising:
a fuel tank having a wall with an inner surface partially defining an interior space;
a valve assembly including:
a component;
a valve housing having a recess sufficiently sized to contain the component, and having an opening at which the component is exposed when the component is contained in the recess; wherein the valve housing forms an entrance to the recess;
wherein the component has substantially flat opposing faces and has a side between the faces; and wherein the recess is a slot and the entrance is sufficiently deep to permit the component to be inserted into the slot through the entrance only with the side facing the entrance so that one of the substantially flat opposing faces faces the opening; and
wherein the valve assembly is mounted to the inner surface of the wall of the fuel tank with the opening facing the inner surface, thereby enabling the component to be detected from outside of the fuel tank.

15. The assembly of claim 14, wherein the valve housing forms a lip configured to permit the component to be inserted through the entrance into the recess past the lip and to interfere with movement of the component out of the recess when the component contacts the lip to thereby retain the component in the recess.

16. The assembly of claim 15, wherein the lip is a depression in a surface of the valve housing;
wherein the lip angles from the surface toward the recess; and
wherein the lip has an inner portion configured to interfere with the component when the component contacts the lip to prevent movement of the component out of the recess.

17. The assembly of claim 15, wherein the recess extends through the valve housing; wherein the valve housing is configured with ledges surrounding a portion of the recess and that partially cover the component when the component is in the recess.

18. The assembly of claim 17, wherein the lip is at an edge of the recess.

19. The assembly of claim 17, wherein the ledges are configured to contact both of the substantially flat opposing faces.

20. The assembly of claim 14, wherein the valve housing is configured with ledges surrounding a portion of the recess and that partially cover the metal disc when the metal disc is in the recess.

* * * * *